June 24, 1941.  E. J. ROTH ET AL  2,246,759
EXTRUSION DEVICE AND METHOD OF MAKING FORMATIONS OF PLASTIC MATERIAL
Filed Oct. 2, 1940  5 Sheets-Sheet 1

INVENTORS
ERNEST J. ROTH
JOHN L. ELLIS
BY
Charles A. Morton
ATTORNEY

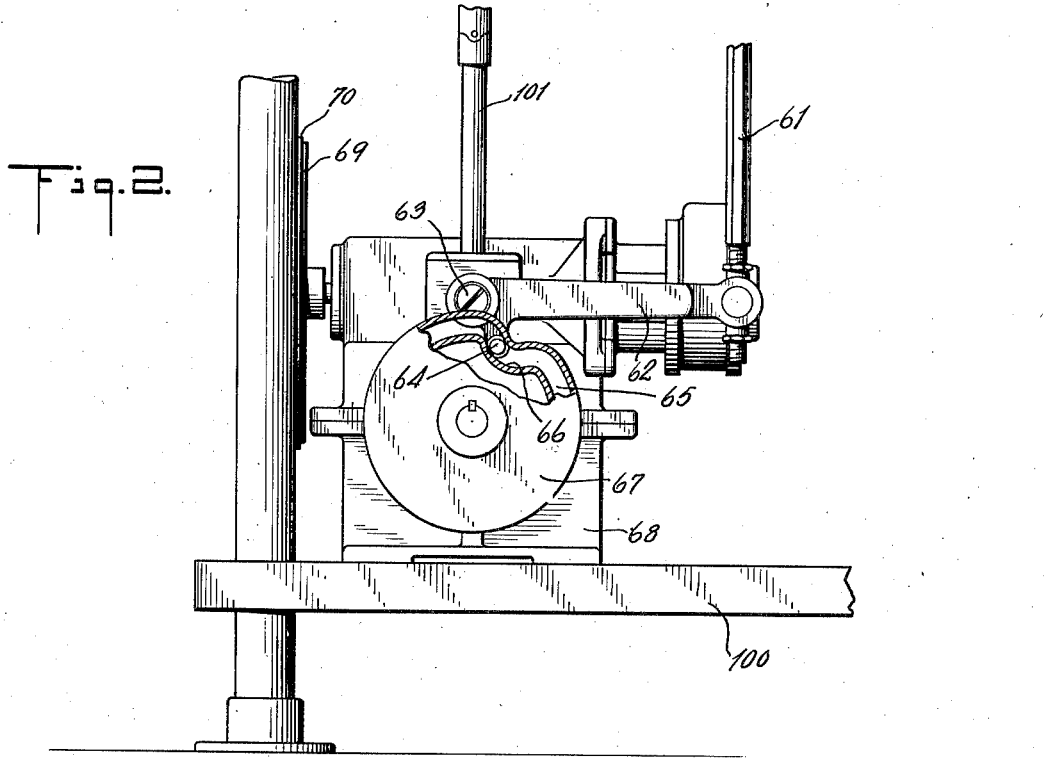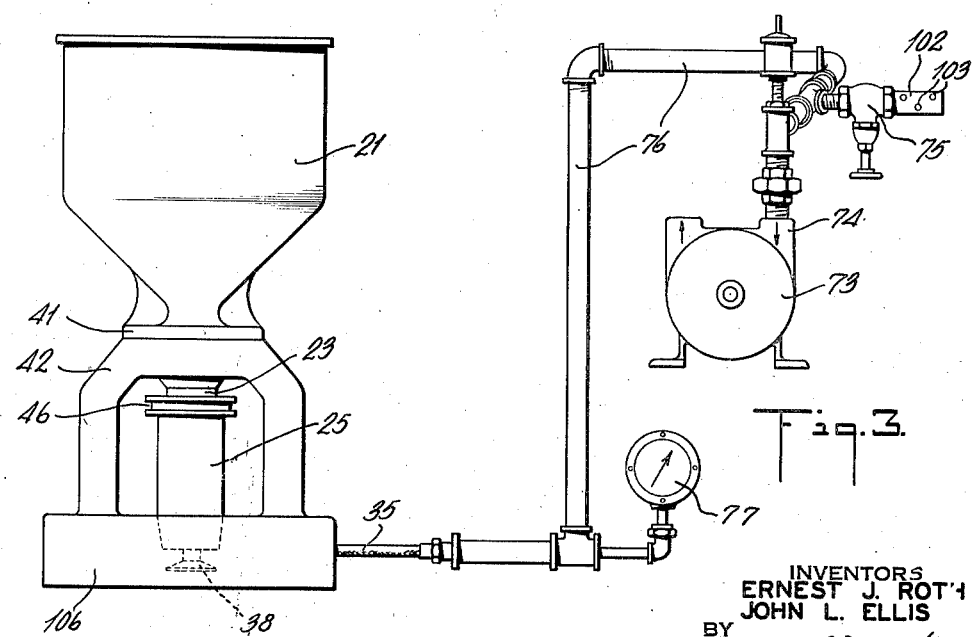

INVENTORS
ERNEST J. ROTH
JOHN L. ELLIS
BY
Charles A. Morton
ATTORNEY

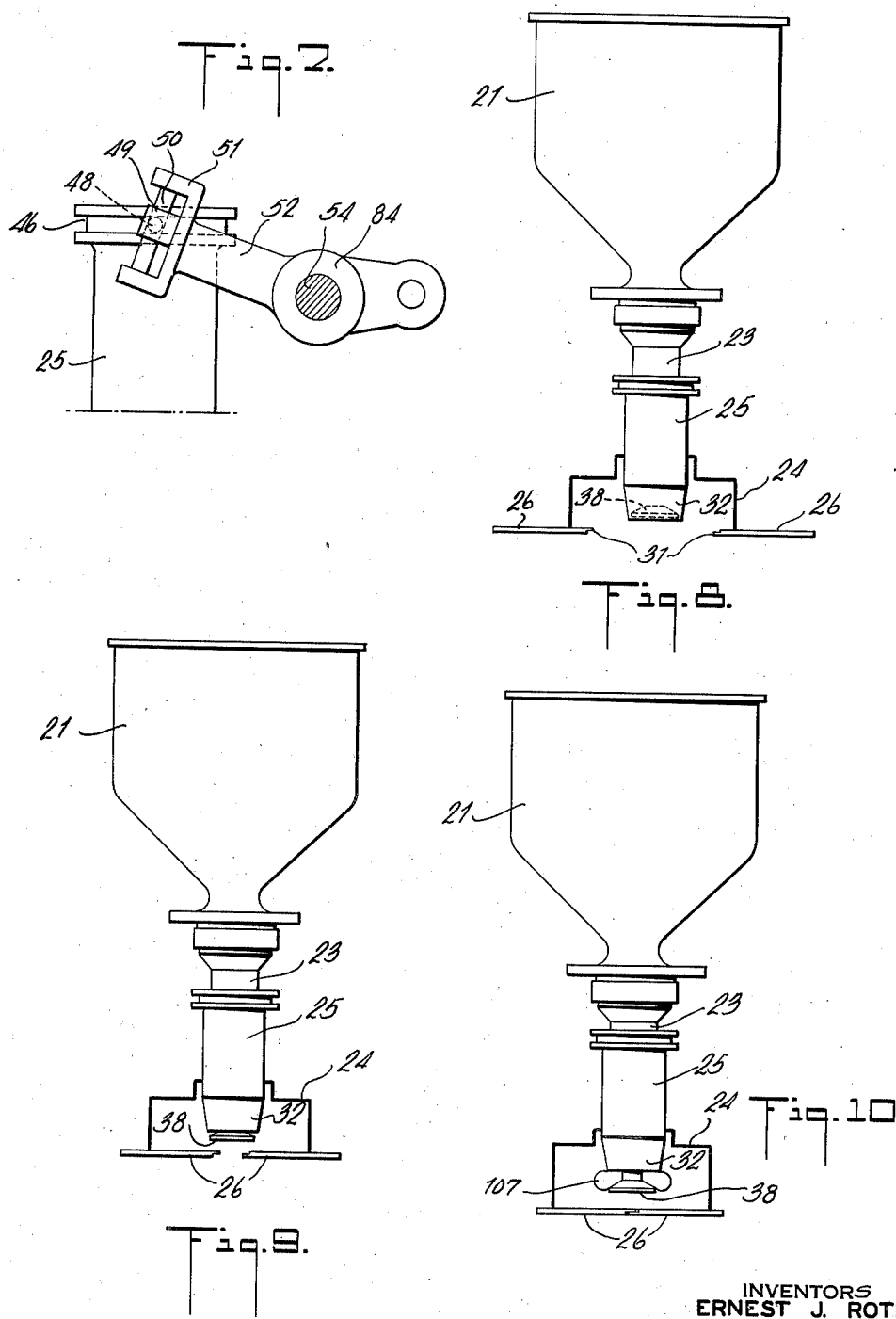

Patented June 24, 1941

2,246,759

UNITED STATES PATENT OFFICE 2,246,759

EXTRUSION DEVICE AND METHOD OF MAKING FORMATIONS OF PLASTIC MATERIAL

Ernest J. Roth, Norwood, N. J., and John L. Ellis, New York, N. Y., assignors to Joe Lowe Corporation, New York, N. Y., a corporation of Delaware Application October 2, 1940, Serial No. 359,356

9 Claims. (Cl. 107—54)

This invention relates to improvements in extrusion devices, and an improved method of making formations of plastic material. It is particularly applicable for use in extrusion machines of the die expressing type, and more especially for making plastic formations of edible products, such as raw doughnuts made from batter.

One of the most serious problems in machines for extruding dough is agitation or "working" of the dough which tends to toughen the finished product. In an attempt to reduce agitation various mechanical devices have been made. Some extrusion devices have utilized compressed air to express the dough from the machine, thereby reducing the number of movable mechanical parts brought into contact with the dough. In all of the prior art devices however some appreciable measure of mechanical agitation of the dough nevertheless occurs.

One object of this invention is to still further reduce mechanical agitation of the plastic material during its passage through the extrusion machine, thus reducing "working" of the plastic material to avoid toughening of the finished product.

Another object is to insure uniformity of size of the extrusions.

Another object is an extrusion machine which is positive in operation.

Another object is an extrusion machine which is easy to regulate to effect a positive, an instantaneous, and an accurate, variation, in the size of the extrusions.

Another object is an extrusion machine which can be quickly disassembled to facilitate cleaning, readily cleaned, and thereafter rapidly reassembled for further use.

Another object is an extrusion machine of the die-expressing type wherein the extrusion die is the only moving part which contacts the dough in its passage through the extrusion machine.

Another object is an extrusion machine of rugged construction with but few and simple parts.

Another object is the substantial elimination of wastage of the plastic material.

Another object is an extrusion machine which can be reloaded without stopping the machine.

Other objects will appear from the detailed description which follows.

In accordance with this invention plastic material is deposited in a hopper open to atmosphere at the top, said hopper having an intermittently vented extrusion outlet which opens inside a low pressure chamber, whereupon atmospheric pressure above the open hopper expresses the plastic material through the extrusion outlet and over the forming die, and after a sufficient quantity of plastic material has been thus expressed the pressure in the vacuum or low pressure chamber is restored to atmosphere and the plastic material previously extruded owing to the difference in pressure, is severed and released. The size of the extrusions may be controlled in a very positive manner regardless of the viscosity of the plastic by critically regulating the degree of vacuum or low pressure applied at the opened extrusion outlet.

In the drawings comprising five sheets of ten (10) figures numbered Figs. 1 to 10, inclusive.

Fig. 2 is an end view of the power unit, with certain of the parts broken away.

Fig. 3 is a diagrammatic view of the extrusion device and the vacuum pressure system of the power unit.

Fig. 7 is an enlarged view of a detail and

Figs. 8, 9 and 10 are diagrammatic views showing the relative position of the moving parts of the extrusion device at three separate stages of its operating cycle.

Like reference characters designate corresponding parts throughout the several figures of the drawings.

Figure 1:
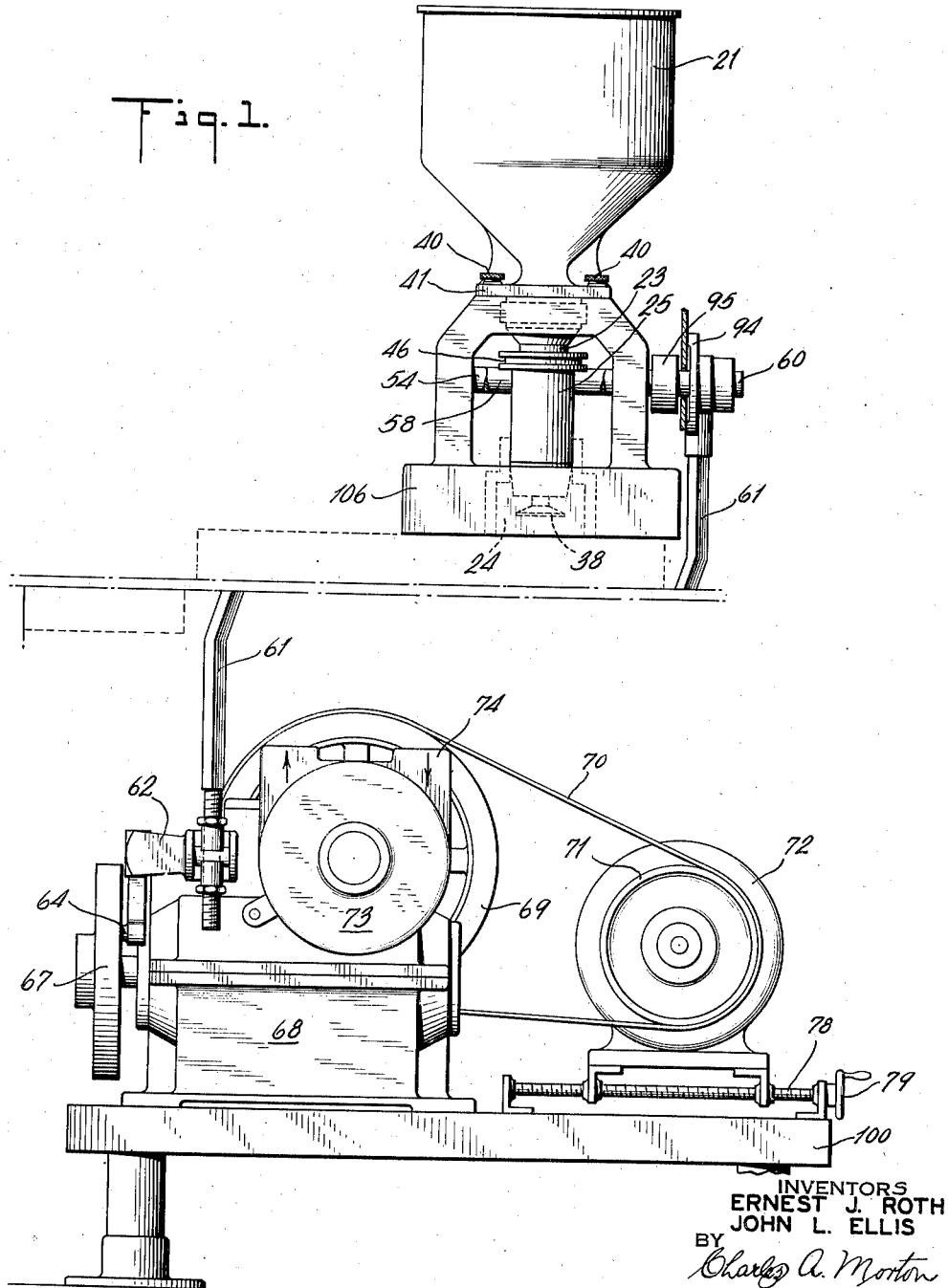
Fig. 1 is a general assembly view of the extrusion device and its associated power unit.

Referring first to Figs. 1 and 3 the extrusion machine and its necessary complementary driving apparatus may be divided into three parts namely: the extrusion device proper shown generally in the upper half of Fig. 1; a suitable power unit for operating the extrusion device shown in the lower portion of Fig. 1; and a vacuum pressure system including a vacuum pump built into the power unit, shown diagrammatically at the right in Fig. 3.

Figure 4:
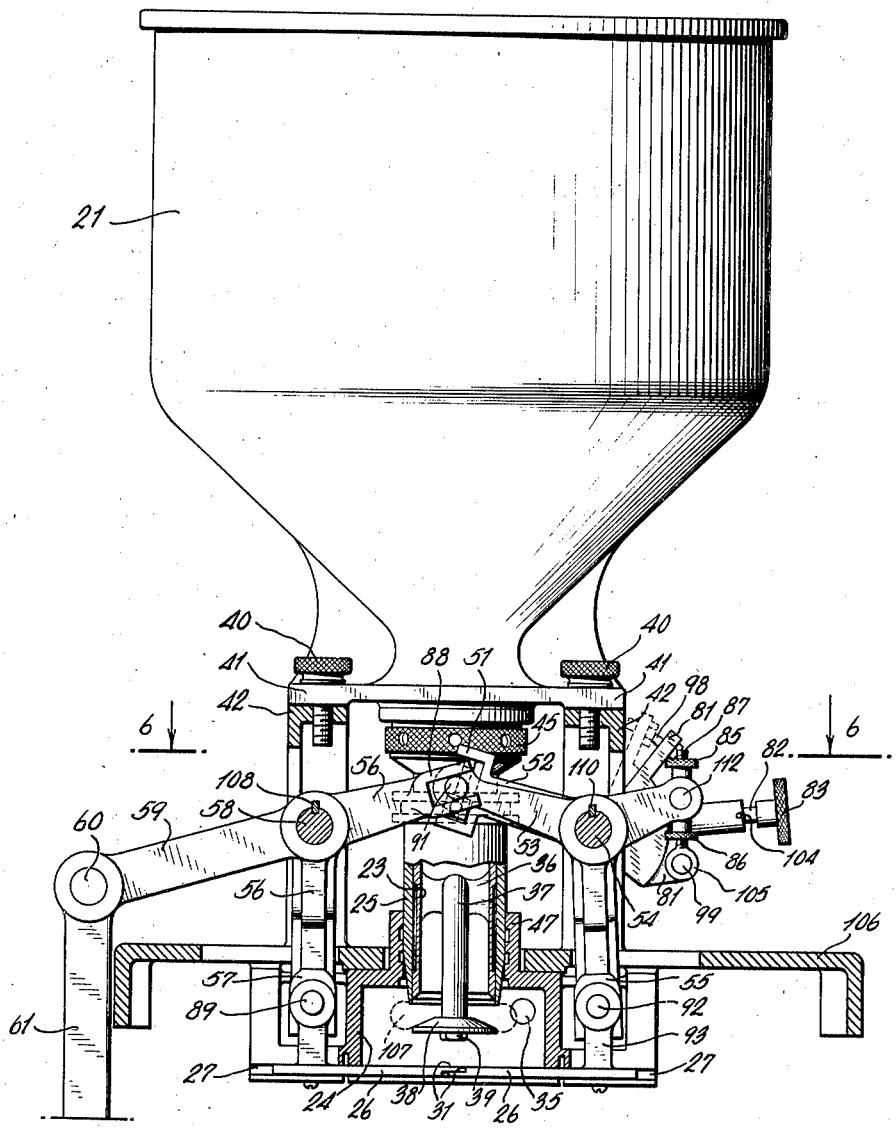
Fig. 4 is a side view of the extrusion machine showing certain of the parts in vertical section with the expressing die open.
Figure 5:
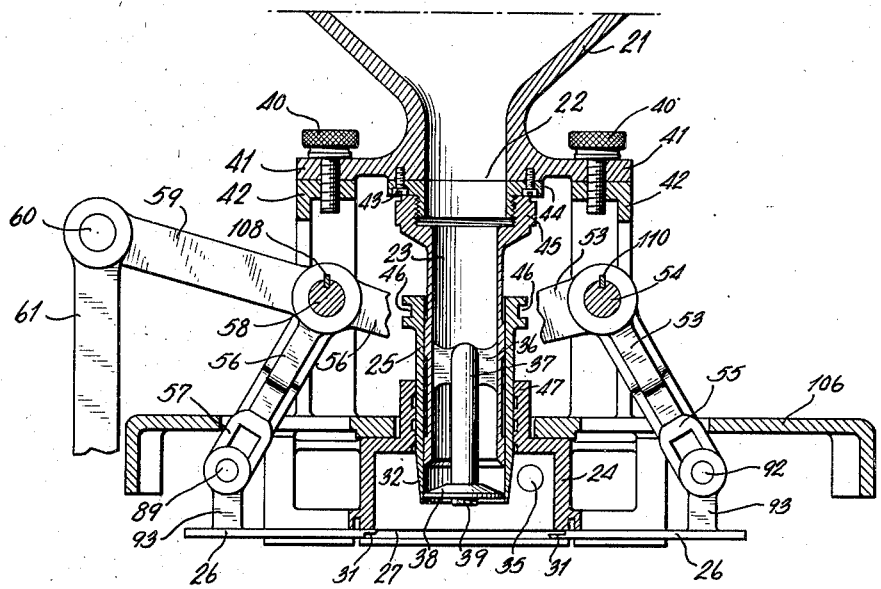
Fig. 5 is a vertical section with the expressing die closed and showing certain of the parts partially broken away.

The extrusion device is best shown in Figs. 4 and 5. It consists of a hopper 21 open at both top and bottom, the hopper outlet 22 (Fig. 5) connecting with a demountably mounted extrusion die consisting of an inner sleeve 23 and an outer cutting sleeve 25 telescopically mounted upon inner sleeve 23. The extrusion die may be detachably connected to hopper outlet 22 in any preferred manner as by means of an intermediate male threaded collar 44 secured to the hopper outlet by means of a series of machine screws 43, the upper end of inner sleeve 23 including a flared and female threaded collar 45 for detachably engaging male threaded collar 44. The lower end of outer cutting sleeve 25 is bevelled at 32 to form a relatively thin cutting edge.

A spider 36 is secured to the interior wall of inner sleeve 23 in any preferred manner as by casting the radial arms of spider 36 and the inner sleeve 23 in one piece. The upper end of stem 37 is male threaded for attachment in a female threaded central opening in spider 36. A bevelled forming disc 38 is secured to the lower male threaded end of stem 37 by means of a suitable lock-nut 39. Forming disc 38 is slightly smaller in diameter than the opening in outer cutting sleeve 25 so that the bevelled lower end 32 of the cutting sleeve passes over and beyond the peripheral edge of forming disc 38 (see Fig. 5) to sever and detach the annular formations of plastic material (Fig. 4) expressed through inner sleeve 23 and shaped by forming disc 38.

Hopper 21 and inner sleeve 23 may be mounted upon the frame members 42—42 (Figs. 4 and 5) of casting 106 in any preferred manner, as by means of the holed flanges 41 and the knurled headed bolts 40—40.

The lower portion of cutting sleeve 25 is slidably mounted within the cylindrical neck 47 of vacuum or low pressure chamber 24, to form an air-tight telescopic joint. The side walls of the vacuum or low pressure chamber 24 extend substantially below the forming disc 38 so that the plastic formations extruded over the said forming disc will be spaced away from the top and side walls of chamber 24 and from the sliding shutters 26—26 which when closed form the bottom wall of said vacuum or low pressure chamber. Shutters 26—26 are slidably mounted in the grooves 27—27 formed in the lower end of the side walls of chamber 24, the shutters 26—26 and grooves 27—27 forming an air-tight connection.

Figure 6:
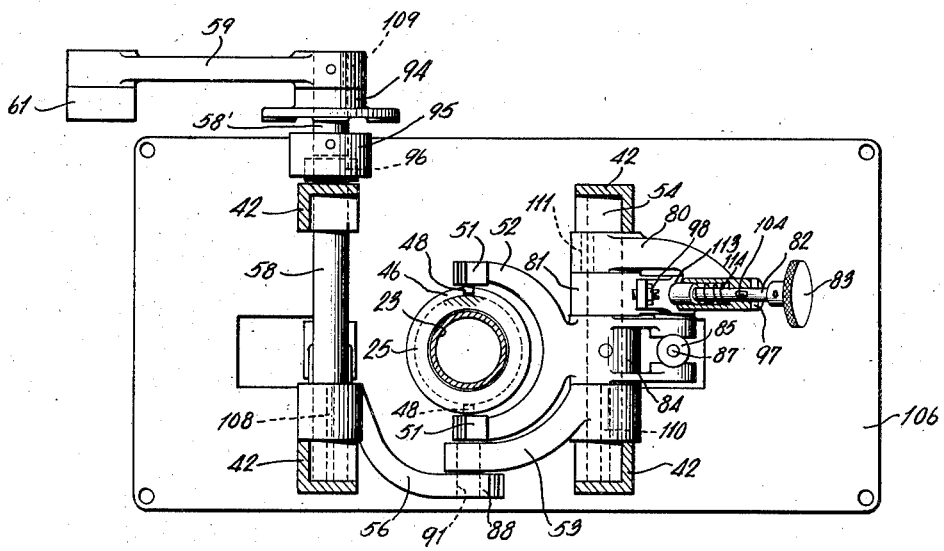
Fig. 6 is a horizontal sectional view taken along the line 6—6 of Figure 4 looking from above.

The only moving part of the extrusion device which comes into physical contact with the plastic material, is the lower bevelled end 32 of outer sleeve 25 which contacts only an insignificant portion of the plastic, and then only long enough to close and re-open the extrusion outlet and effect shearing. Outer sleeve 25 and sliding shutters 26—26 are driven from the power unit through one common connecting rod 61. Referring to Figs. 4 to 6, connecting rod 61 is connected by a shaft 60 to a lever 59, and the opposite end of lever 59 is connected through a shaft 58' and then by way of a suitable clutch 95, 96 to a shaft 58 journalled in the supporting frame 42—42 (Fig. 6).

Bell crank lever 56 which is keyed at 108 to shaft 58 terminates in two forked end members 57 and 88. The forked end 57 engages a shaft 89 journalled in a pair of studs 93 which are secured to one of the sliding shutters 26. Forked end 88 of bell crank lever 56 engages a pin 91 extending from the upper end of a bell crank lever 53 which is keyed at 110 to a shaft 54 (Figs. 4 to 6). The lower end of bell crank lever 53 terminates in a forked member 55 which engages a shaft 92 journalled in a pair of studs 93 which are attached to the other sliding shutter 26. Thus when connecting rod 61 oscillates it rocks lever 59 which in turn rocks shaft 58 through clutch 95—96 thus rocking bell crank lever 56 which in turn rocks bell crank lever 53 keyed at 110 to shaft 54. The bell crank levers rock towards and away from each other to move the shutters 26—26 from open position (Fig. 5) to closed position (Fig. 4) and back again, thereby closing and opening the vacuum or low pressure chamber 24. The engaging edges of sliding shutters 26—26 are formed with offset overlapping tongues 31—31 to insure an air-tight connection whenever the shutters are interlocked in their closed position (Fig. 4).

Telescopic action is imparted to outer sleeve 25 by means of a rocking bifurcated lever arm 52 (Fig. 6) having lifting pins 48—48 engaging in an annular guide channel 46 formed in the upper end of sleeve 25.

The lifting pins 48 (Fig. 6 and Fig. 7) which engage the annular guide channel 46 are not rigidly secured to bifurcated lever arm 52, but are provided with enlarged heads 49 (Fig. 7) which are transversely drilled to receive a traveller pin 50 which is mounted between the prongs of a fork 51 formed at either end of bifurcated lever arm 52. Thus when lever arm 52 rocks the traveller pins 50—50 slide loosely in the pin heads 49—49 until fork 51 approaches either limit of its travel whereupon the lower or upper prong of fork 51 as the case may be, engages pin head 49 to raise or lower the pins 48—48 thereby raising or lowering sleeve 25 to open (or close) the extrusion outlet formed between the lower end 32 of sleeve 25 and forming disc 38. The hub 84 of lever arm 52 is freely mounted upon shaft 54 and is adjustably connected to clutch 81 (Fig. 6) by means of an adjusting pin 87 having an ear 105 which is pivotally mounted upon bolt 99 (Fig. 4) to clutch 81. Clutch pin housing 80 forming the other portion of the clutch is keyed at 111 to shaft 54 and is rocked with shaft 54 whenever bell crank lever 53 is rocked by bell crank lever 56. A clutch pin 82 is slidably rotatably mounted in clutch pin housing 80 to engage and disengage recess 113 in clutch 81. To disengage clutch pin 82 from clutch 81 the knob 83 is pulled outwards against the increased tension of a coiled spring 114 (Fig. 6) until the pin 104 disengages the slot 97 of housing 80 whereupon clutch knob 83 is rotated to cause pin 104 to lock against the head of the housing in which position clutch pin 82 is disengaged from the recess 113 of clutch 81. The stroke of outer sleeve 25 is regulated by the motion of bifurcated lever arm 52, whose movement is adjustably controlled by the upper and lower adjusting nuts 85 and 86 (Fig. 4) which are threadably adjustable upon adjusting pin 87. A threaded stop 98 is adjustably mounted in clutch 81 (Figs. 4 and 6), so that when the clutch pin 82 is disengaged from clutch 81, outer sleeve 25 slides downwards upon inner sleeve 23 until stop 98 engages the cross web of supporting frame 42 (see dotted position Fig. 4) thus limiting the stroke of bifurcated lever arm 52 which in turn checks the downward movement of outer sleeve 25.

Cutting sleeve 25 and sliding shutters 26—26 are accordingly operated in the manner previously described by connecting rod 61 (Fig. 4), and the connecting rod is actuated from the power unit (Figs. 1 and 2). The various elements of the power unit are supported in any suitable manner as upon a metal base 100. The power unit includes an electric motor 72, movable under control of a worm screw 78 and an adjusting wheel 79, towards and away from gear reduction box 68. Motor 72 drives pulley 69 of gear reduction box 68, by means of drive belt 70. By operating worm screw 78, the distance between gear reduction box 68 and motor 72 is varied, thus changing the tension of the drive belt 70 to vary the width of the V shaped channel in motor pulley 71 and the diameter of the seat in said V shaped channel occupied by drive belt 70, thus regulating the speed of pulley 69. Pulley 69 of gear reduction box 68 drives a revolving disc 67 through a reducing gear train (not shown). One side of revolving disc 67 includes a box cam 65 for actuating connecting rod 61 through a rocker arm 62, which rocker arm is pivoted on rocker screw 63 and is driven by cam follower 64.

When the extrusion device is used for extruding raw doughnuts, it is mounted above a doughnut frying machine having conveying mechanism for progressing the doughnuts through the machine during the cooking period. As the doughnut frying machine and its associated conveyor mechanism form no part of the present invention they are indicated in the drawings (Fig. 1) merely by a broken line, although the drive shaft 101 for operating the conveyor mechanism of the doughnut frying machine is shown in Fig. 2 of the drawings.

The power unit (Fig. 1) which is mounted beneath the doughnut machine includes a vacuum pressure pump 73 coupled to the drive shaft of gear reduction box 68. Vacuum pressure pump 73 forms a part of the vacuum pressure system (Fig. 3) for reducing the pressure below atmosphere in vacuum pressure pipe 35 (Figs. 3 and 5), thereby maintaining reduced or sub-atmospheric pressure in low pressure chamber 24 whenever the sliding shutters 26—26 of said chamber are closed as shown in Fig. 4. Vacuum pressure pipe 35 which may be flexible is connected to the vacuum or intake side 74 of pump 73 by way of a piping system 76. A suitable regulating valve 75 is connected with piping systems 76 to regulate the degree of vacuum pressure in said system, and a suitable vacuum gauge 77 is also employed so that when regulating valve 75 is manipulated the resulting pressure reading can be observed upon vacuum gauge 77. Regulating valve 75 is connected to atmosphere through a nipple 102 which is perforated at 103. By manipulating valve 75 the degree of vacuum pressure in vacuum pressure pipe 35 and therefore in vacuum chamber 24 may be regulated within very critical limits, thereby critically regulating the size of the extrusions of plastic material extruded through the opening formed between the outer sleeve 25 and forming disc 38 (Fig. 4).

*Principle of operation*

With the hopper 21 filled with a quantity of plastic material such as dough batter, and the motor 72 running, the vacuum pump 73 reduces the pressure in the pipe 35 (Fig. 5) below atmosphere. Clutch knob 83 is rotated until pin 104 registers in slot 97 thus allowing clutch pin 82 to engage in the recess 113 in clutch 81. The sliding shutters 26—26 (Fig. 8) now start their inward movement under control of bell crank levers 53 and 56 (Fig. 5), and as bell crank lever 53 is keyed at 110 to shaft 54 said shaft rocks, thus rocking clutch pin housing 80, clutch 81 and bifurcated lever arm 52, in a clockwise direction (Fig. 7). As lever arm 52 rocks, the forks 51—51 forming the extremities of the lever arm move upwards and their associated traveller pins 50—50 slide through the pin heads 49—49 of the lifting pins 48—48, until the lower prong of each fork 51 engages the lower edge of the pin heads 49—49 (Fig. 7). This lost motion between the traveller pins 50—50 and the pin heads 49—49 tends to retard the upward movement of outer sleeve 25. As the sliding shutters move inwards towards each other to effect interengagement of their off-set overlapping tongues, the lower prongs of the forks 51—51 engage the pin heads 49—49 and cause outer sleeve 25 to move upwards upon inner sleeve 23 thus uncovering forming disc 38 and opening the extrusion die (Fig. 9). At this point in the cycle the air pressure above the plastic in hopper 21 and at the extrusion outlet is the same. As the cycle of operations continues the off-set overlapping tongues 31—31 of the sliding shutters 26—26 interengage (Figs. 4 and 10) and the air in low pressure chamber 24 is drawn off by vacuum pump 73 thus reducing the pressure in chamber 24 below the atmospheric pressure applied above the open hopper 21, and causing a quantity of plastic to be extruded through the opening in the extrusion die and to pass downwards over forming disc 38 (Fig. 1). As cam follower 64 (Fig. 2) enters the eccentric portion 66 of cam 65, connecting rod 61 rocks bell crank levers 53 and 56 and bifurcated lever arm 52 to first move sliding shutters 26—26 apart and re-establish atmospheric pressure in chamber 24 and then to move outer sleeve 25 downwards over forming disc 38 to sever the annular formation of plastic. Before the severing operation is completed, the sliding shutters 26—26 have moved outwards far enough to permit the severed annular formations of plastic material to drop through the chamber 24 without contacting either the side walls of the chamber or any portion of the sliding shutters 26—26, thus completing the operating cycle, which cycle is then repeated.

The hopper 21 may be re-charged with plastic as often as desired without interfering with the continuous operation of the extrusion device. The sliding movement of outer sleeve 25 may be advanced or retarded by varying the position of the upper and lower adjusting nuts 85 and 86 upon the adjusting pin 87. The quantity of plastic to be extruded may also be regulated quite critically by operating regulating valve 75 (Fig. 3) to vary the pressure in the piping system 76 and in low pressure chamber 24. The device will continue to function to extrude perfect annular formations so long as a sufficient quantity of plastic remains in inner sleeve 23 to prevent atmospheric pressure above hopper 21 from entering low pressure chamber 24 through sleeve 23, so that the quantity of plastic material which becomes unusable is thus reduced to a minimum.

The extrusion device (Fig. 4) is attached to the framework of the frying kettle or doughnut machine by means of four machine screws (not shown) which are inserted in the four holes shown at the four corners of the frame base 106 (Fig. 6). Thus to remove the extrusion device (Fig. 4) as one single unit, it is only necessary to disconnect the pipe union connection of vacuum pressure pipe 35 (Fig. 3) from chamber 24 and to remove the four machine screws from base 106 (Fig. 6) thus allowing clutch members 95 and 96 to disengage, whereupon the extrusion device is completely detached from both the frying kettle and from connecting rod 61 of the power unit, and the extrusion device may now be bodily removed for cleaning and adjusting purposes.

By merely removing the knurled head bolts 40—40 (Fig. 4), hopper 21 may be lifted until inner sleeve 23 is detached from outer sleeve 25, whereupon hopper 21 and inner sleeve 23 may be cleaned; or inner sleeve 23 may be detached from hopper 21 by rotating threaded flared collar 45. To detach outer sleeve 25, clutch knob 83 is drawn outwards against the increased tension of spring 114 until the pin 104 disengages slot 97, whereupon knob 83 is rotated to engage pin 104 against the shoulder of clutch pin housing 80 thus disengaging clutch pin 82 from recess 113. If outer sleeve 25 is now released it will slide downwards under the influence of gravity until the adjustable stop 98 engages the cross member of supporting frame 42 as indicated in broken lines in Fig. 4. By manipulating sleeve 25 the lifting pins 49 may be disengaged from the annular guide channel 46, and sleeve 25 may be bodily removed, leaving the bell crank levers 53, 56 and the bifurcated lever arm 52 readily accessible for cleaning.

What is claimed is:

1. The combination with a die for extruding and forming plastic material and for releasing the plastic material when formed, of a chamber reducible to a pressure below atmosphere and surrounding the die outlet for housing the plastic formations in succession without injuring them, and the lower end of said chamber being operable to move out of the path to be travelled by each plastic formation after it is released from the die.

2. An extrusion device comprising a chamber reducible to a pressure below atmosphere, said chamber having its lower end adapted to open to admit and to close to exclude air at atmospheric pressure, a die for extruding plastic material, said die having its valve controlled outlet extending into said chamber above said movable lower end, and means for opening and closing said outlet valve and said bottom wall in properly timed sequence.

3. An extrusion device comprising a chamber normally maintained at a pressure below atmosphere, the lower end of said chamber being adapted to open to atmosphere and close again, a die for extruding plastic material, said die being open at its upper end to receive the plastic material and having its valve controlled outlet extending into said chamber in spaced relation to the walls thereof, a single actuator operable to open and close said outlet valve and the lower end of said chamber, and means for timing the operation of said outlet valve with respect to the operation of the lower end of said chamber.

4. An extrusion device comprising a chamber normally maintained at a pressure below atmosphere, the lower end of said chamber being adapted to open to atmosphere and close again, a die for extruding plastic material, said die being open at its upper end to receive the plastic material and having its valve controlled outlet extending into said chamber in spaced relation to the walls thereof, means operable to open and close said outlet valve, and means operable to open and close the lower end of said chamber.

5. An extrusion device comprising a chamber normally maintained at a pressure below atmosphere, the lower end of said chamber being adapted to open to atmosphere and close again, a die for extruding plastic material, said die being open at its upper end to receive the plastic material and having its valve controlled outlet extending into said chamber in spaced relation to the walls thereof, means operable to open and close the lower end of said chamber, means operable under control of said chamber operating means to open and close said outlet valve, and means for timing the operation of said outlet valve with respect to the operation of the lower end of said chamber.

6. In an extrusion device and in combination a die for extruding and forming plastic material and for releasing the plastic material when formed, a chamber normally maintained at a pressure below atmosphere and surrounding the die outlet for housing the plastic formations without injuring them, the lower end of said chamber being operable to move out of the path travelled by each plastic formation after it is released from the die, and means for opening and closing said outlet valve and for moving the lower end of said chamber in properly timed sequence.

7. In an extrusion device and in combination a die for extruding and forming plastic material and for releasing the plastic material when formed, a chamber normally maintained at a pressure below atmosphere and surrounding the die outlet for housing the plastic formations without injuring them, the lower end of said chamber being operable to move out of the path travelled by each plastic formation after it is released from the die, a single actuator operable to open and close said outlet valve and to move the lower end of said chamber, and means for timing the operation of said outlet valve with respect to the movement of the lower end of said chamber.

8. The combination with an extrusion device comprising a die for extruding and forming plastic material and for releasing the plastic material when formed, a chamber normally maintained at a pressure below atmosphere and surrounding the die outlet for housing the plastic formations without injuring them, the lower end of said chamber being operable to move out of the path travelled by each plastic formation after it is released from the die, a drive shaft, means coupled with said drive shaft operable to open and close the die outlet and to move the lower end of said chamber in properly timed sequence; and a power unit positioned beneath said extrusion device for driving the same, said power unit including a cam for timing the operation of said drive shaft; of but one single connecting rod actuated from said cam for driving said drive shaft, and clutch mechanism for quickly coupling and uncoupling said drive shaft and said connecting rod.

9. Method of making formations of plastic material which consists in subjecting the top of a column of the plastic material to atmospheric pressure, reducing the pressure at the bottom of the column below atmosphere thereby extruding a quantity of the plastic, imparting shape to the plastic thus extruded, arresting the further extrusion of the plastic material by subjecting the shaped extrusion to atmospheric pressure, and severing the shaped portion of extruded plastic.

ERNEST J. ROTH.
JOHN L. ELLIS.